United States Patent
Yamamoto

(10) Patent No.: US 12,339,485 B2
(45) Date of Patent: Jun. 24, 2025

(54) DISPLAY DEVICE, OPERATING DEVICE AND IMAGE FORMING APPARATUS

(71) Applicant: CANON KABUSHIKI KAISHA, Tokyo (JP)

(72) Inventor: Daisuke Yamamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 112 days.

(21) Appl. No.: 18/154,247

(22) Filed: Jan. 13, 2023

(65) Prior Publication Data
US 2023/0266517 A1    Aug. 24, 2023

(30) Foreign Application Priority Data
Feb. 24, 2022   (JP) .................................. 2022-027106

(51) Int. Cl.
*F21V 8/00*    (2006.01)

(52) U.S. Cl.
CPC ......... *G02B 6/0045* (2013.01); *G02B 6/0036* (2013.01); *G02B 6/006* (2013.01)

(58) Field of Classification Search
CPC .... G02B 6/0045; G02B 6/006; H01H 13/023; H01H 2219/062; G03G 15/5016
See application file for complete search history.

(56) References Cited

U.S. PATENT DOCUMENTS

| | | | | |
|---|---|---|---|---|
| 2010/0142225 | A1* | 6/2010 | Kurihara | G02B 6/0016 362/621 |
| 2022/0180847 | A1* | 6/2022 | Imamura | G10H 1/0016 |

FOREIGN PATENT DOCUMENTS

| | | | | |
|---|---|---|---|---|
| CN | 109643613 | A * | 4/2019 | ................ F21V 5/04 |
| JP | 3295319 | B2 * | 6/2002 | |
| JP | 2008-299444 | A | 12/2008 | |
| JP | 2014022126 | A * | 2/2014 | |
| JP | 2017044920 | A * | 3/2017 | |
| JP | 2019010798 | A * | 1/2019 | |

* cited by examiner

*Primary Examiner* — Fatima N Farokhrooz
(74) *Attorney, Agent, or Firm* — Venable LLP

(57) ABSTRACT

A display device includes a sheet on which a pattern is printed, a light source emitting light to brighten the pattern; and a light guide guiding the light emitted from the light source to the sheet. The light guide includes an incident surface provided at one end portion thereof in a longitudinal direction and an emission surface provided at the other end portion thereof. As viewed in the longitudinal direction, the incident surface is smaller than an area where the pattern is printed in the sheet, the emission surface includes a first emission surface which overlaps at least a part of the pattern and has a portion overlapping the light source, and a second emission surface which overlaps at least a part of the pattern and does not overlap the light source. The second emission surface is closer to the sheet than the first emission surface.

21 Claims, 8 Drawing Sheets

DISPLAY DEVICE, OPERATING DEVICE AND IMAGE FORMING APPARATUS

FIELD OF THE INVENTION AND RELATED ART

The present invention relates to a display device, an operating device and an image forming apparatus, and, for example, to the image forming apparatus which comprises an operating portion and a display portion.

There is a demand for miniaturization and diversification in image forming apparatuses such as copiers, printers, and facsimiles. In a conventional image forming apparatus, a sheet is fed by a feed roller and conveyed by a conveyance roller. Then, a toner image is transferred to the sheet by a transfer roller and a photosensitive drum, and the toner image is fixed to the sheet by a fixing device. In the case of single-side printing, the sheet is discharged by a discharge roller. In addition, in the case of double-side printing, the sheet is reversed by the discharge roller, conveyed through a double-side conveyance path, conveyed by the conveyance roller again, and discharged in the same way as in the case of single-side printing.

For the operating portion and the display portion of the image forming apparatus, various methods are used according to product specifications such as a mechanical button method, a sheet method, and an electrostatic touch panel as disclosed in Japanese Patent Application Laid-Open No. 2008-299444. Among such methods, the sheet method, in which a sheet with a control portion and a display portion is affixed to an exterior surface of the image forming apparatus, is commonly used as an inexpensive configuration that uses mechanical buttons, electric tact switches, light guides, LEDs and so forth under the sheet. This method is a method in which a user operates the sheet, which makes a contact with the mechanical button below the sheet, and a contact portion with a tact switch on the mechanical button switches on and off when the tact switch is pressed. In addition, in the sheet method, a light guide is used to permit transmission of light emitted from a LED and illuminate icons printed on a sheet surface to indicate errors etc. to the user. The sheet method is widely used in image forming apparatuses etc.

In recent years, however, as a means for improving usability of the operating portion and the display portion, there is a demand for higher than conventional performance, such as user operability and visibility. In particular, designability also must be considered in a design process, such as placing LEDs in the center of the buttons and making the mechanical buttons themselves glow to improve visibility. Furthermore, as product miniaturization reduces a space available for the operating portion itself, and as products become more diversified through changes in the operating portion, the placement of parts may be more limited due to restrictions imposed by commonization. It has been a challenge to maintain usability due to the difficulty to design to fulfill these requirements along with improved button operability and visibility.

When an icon is illuminated using LEDs and a light guide, an area straight above the LEDs may glow strongly, which may cause an unevenness of the light quantity depending on a design of the icon. One solution to the unevenness of the light quantity is to use a milky white material for the light guide, but this may cause the light to be too diffused and reduce the light quantity. Furthermore, in consideration of usability, if the design is such that the icon is not normally visible because it is the same color as the background of the sheet, and the icon appears only when it glows, more LED light quantity is required. However, LEDs with high light quantity are expensive, and to make the LEDs inexpensively, it is necessary to emit stronger light evenly by concentrating the light with a means such as light guides made of clear materials.

In addition, when the user presses down on the sheet, in cases where there is no gap or there is only a very small (narrow) gap between the sheet and a mechanical button cover that covers an area around the mechanical button, the operability may be reduced. On the other hand, if the gap between the sheet and the mechanical button cover is large, then parts of the sheet other than the area of the mechanical button pressed by the user may also be flexed, which may degrade the appearance.

SUMMARY OF THE INVENTION

In order to solve the issues mentioned above, the present invention is provided with the following configuration.

(1) A display device displaying information to a user, the display device comprising: a first sheet on which a pattern corresponding to the information is printed, a light source configured to emit light to brighten the pattern, and a light guide including an incident surface provided at one end portion thereof with respect to a first direction perpendicular to the first sheet and permitting incidence of the light emitted from the light source and an emission surface provided at the other end portion thereof with respect to the first direction and permitting emission of the light incident from the incident surface, and configured to guide the light emitted from the light source to the first sheet, wherein, as viewed in the first direction, the incident surface is smaller than an area where the pattern is printed in the first sheet, wherein, as viewed in the first direction, the emission surface includes a first emission surface which overlaps at least a part of the pattern and has a portion overlapping the light source, and a second emission surface which overlaps at least a part of the pattern and does not overlap the light source, and wherein the second emission surface is closer to the first sheet than the first emission surface.

(2) An image forming apparatus comprising: a display device according to (1); and an image forming portion configured to form an image on a recording material.

(3) An operating device in which an operation is performed by a user, the operating device comprising: a second sheet on which a pattern corresponding to the operation is printed; a button moving in a moving direction by being pressed via the second sheet; a cover member covering a periphery of the button; and a switch switching an electric signal in interrelation with pressing the button, wherein the button includes a contacting surface contacting the second sheet when the button is pressed via the second sheet, wherein the cover member includes a first surface configured to contact the second sheet, and a second surface; and wherein the first surface is higher than the second surface and the second surface is provided at a position closer to the button with respect to a direction perpendicular to the moving direction than the first surface.

(4) An image forming apparatus comprising: an operating device according to (3) and an image forming portion configured to form an image on a recording material.

(5) An image forming apparatus comprising: a display device according to (1); an operating device according to (3); and an image forming portion configured to form an image on a recording material.

Further features of the present invention will become apparent from the following description of exemplary embodiments with reference to the attached drawings.

DESCRIPTION OF THE EMBODIMENTS

Image Forming Apparatus

Figure 1:
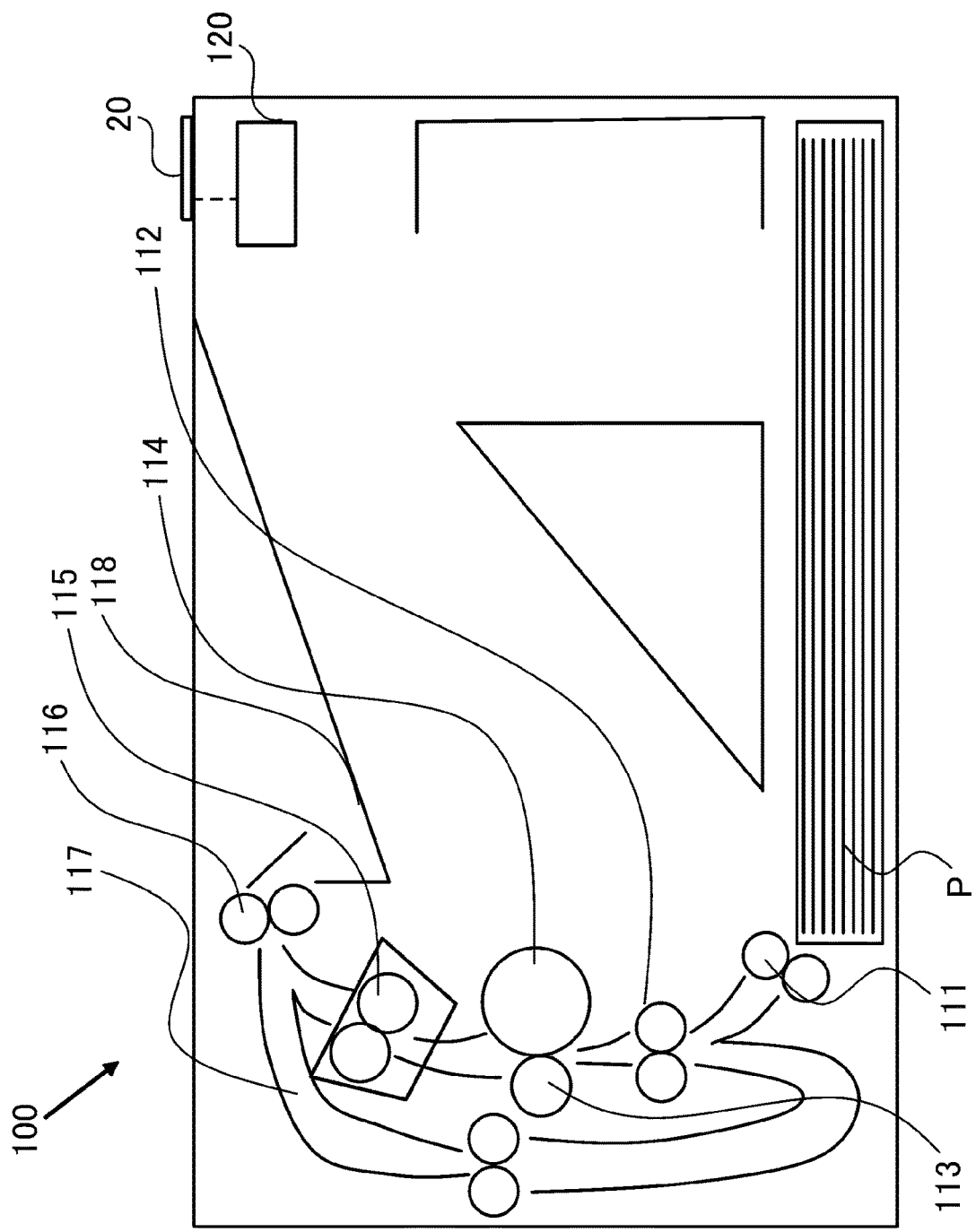
FIG. 1 is a sectional view of a laser beam printer according to embodiments 1, 2 and 3.

FIG. 1 is a cross-sectional view illustrating a configuration of a laser beam printer which is an image forming apparatus including an image forming portion that forms images on a sheet P which is a recording material. The laser beam printer (hereinafter referred to as a "printer 100") includes the image forming portion that forms images, a sheet feeding device that separates and feeds a sheet P one by one to the image forming portion, a laser scanner unit, a fixing device, and a discharge tray. Here, the image forming portion includes components that can be attached to and detached from the printer 100 main body such as a process cartridge and a transfer roller. Incidentally, the process cartridge includes a photosensitive drum 114, a charging roller (not shown), a developing unit (not shown), a cleaning portion (not shown) and so forth.

The printer 100 also includes a control unit 120 that controls the entire printer 100. The control unit 120 includes a CPU, a ROM, a RAM, a timer and so forth. The CPU controls each operation of the printer 100 by executing a program stored in the ROM while using the RAM as a temporary working area. The printer 100 also includes a display operating portion 20 for users to perform various operations of the printer 100. Information input from the display operating portion 20 is sent to the control unit 120. The control unit 120 also displays information etc. regarding a status of the printer 100 etc. on the display operating portion 20. Details of the display operating portion 20 will be described later.

The printer 100 receives image information from an external device such as a personal computer, and when the control unit 120, which processes this image information, sends a print signal, a feeding roller 111 rotates. This allows the sheet P, which is stacked onto a feeding cassette, to be conveyed to a transfer roller 113 by a conveyance roller 112. Meanwhile, the printer 100 forms an electrostatic latent image on the photosensitive drum 114 and develops the electrostatic latent image with toner to form a toner image based on the image information along with print instructions. The toner image formed on the photosensitive drum 114 is transferred to the sheet P by the transfer roller 113 to form an unfixed toner image on the sheet P.

The position where the toner image on the photosensitive drum 114 is transferred by the transfer roller 113 is called a transfer portion. The sheet P is sent to a fixing device 115, then the unfixed toner image is fixed on the sheet P. The position where the unfixed toner image is fixed by the fixing device 115 is called a fixing portion. After this, the sheet P is discharged onto a discharge tray 118 by a discharge roller 116. In addition, in the case of double-side printing, in which images are formed on both sides of the sheet P, the sheet P is sent to the fixing unit 115, then a conveyance direction of the sheet P is reversed at the discharge roller 116, and the sheet P is conveyed to a double-side path 117. The sheet P passes through the double-side path 117 and is conveyed again to the transfer portion and the fixing portion, and after images are formed on both sides of the sheet P, the sheet P is discharged to the discharge tray 118.

Embodiment 1

Display Operating Portion

Figure 2:
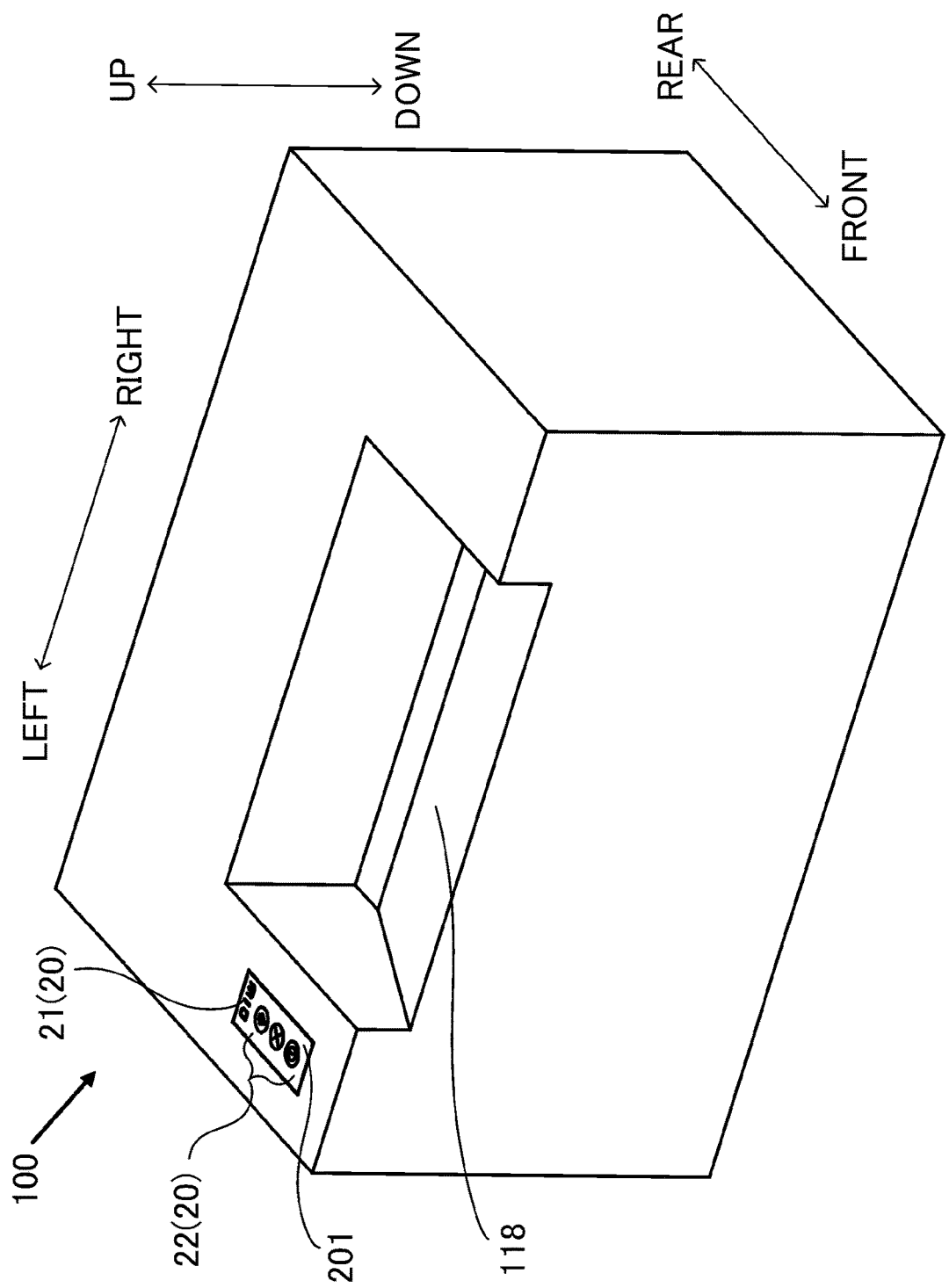
FIG. 2 is a perspective view of the laser beam printer according to the embodiments 1, 2 and 3.

An example of the display operating portion 20 of the printer 100 is described below. Here, FIG. 2 is a perspective view illustrating an external appearance of the printer 100. The conveyance direction of sheet P is defined as a front-back direction, a direction in which the sheet P will be discharged onto the discharge tray 118 is defined as a front side (a near side) and a direction opposite to the front side is defined as a rear side (a back side). A left-right direction is defined as a direction which is substantially orthogonal both to a vertical direction and the front-back direction, which are directions when the printer 100 is set in a place of use and so forth. Incidentally, the term "substantially orthogonal" includes not only cases where the directions are strictly orthogonal, but also cases where the directions can be regarded as being substantially orthogonal.

Figure 3:
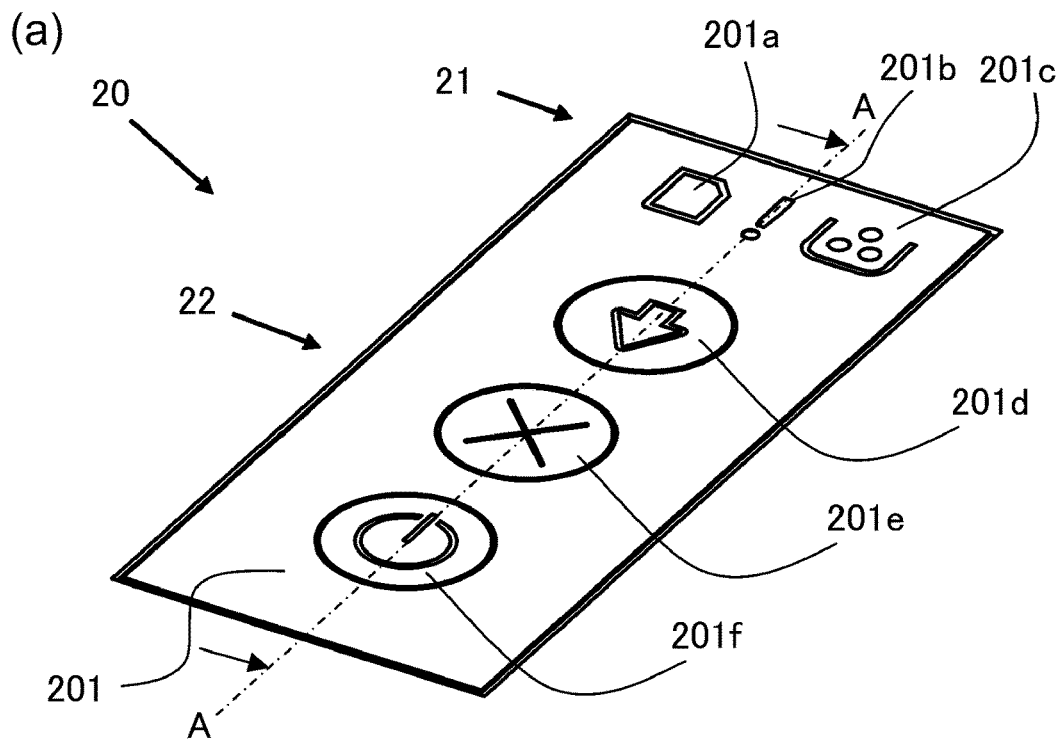
FIG. 3, part (a) and part (b), is a perspective view illustrating a configuration of a display operating sheet and a configuration under the display operating sheet according to the embodiment 1.
Figure 3:
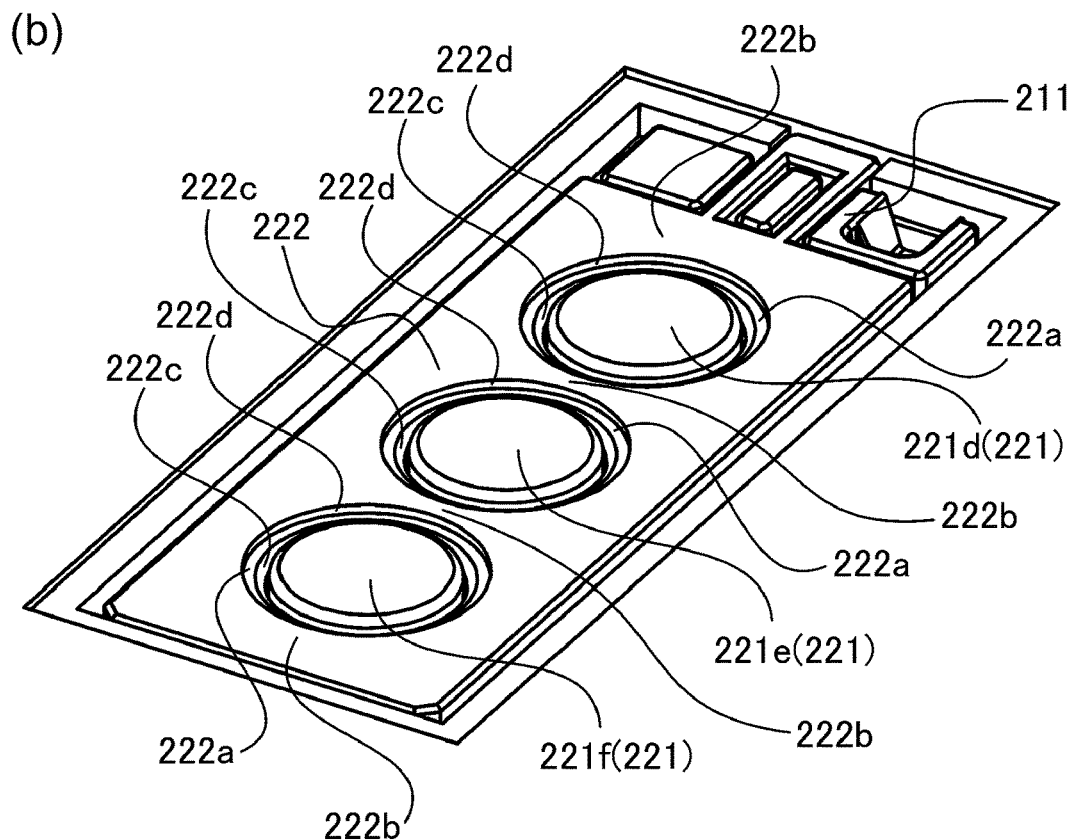

As shown in FIG. 2, the display operating portion 20 is located, for example, on the near-left side of the top surface of the printer 100. The display operating portion includes a display portion 21, an operating portion 22, and a display operating sheet 201. FIG. 3(a) is a perspective view of the display operating portion 20. The display operating sheet 201 is affixed to the exterior surface of the printer 100 as an integral part of the display portion 21 and the operating portion 22. The printer 100 also includes a button holder 202 and an electric board 203 as integral parts of the display portion 21 and the operating portion 22 (see FIG. 4).

Display Portion

The display portion 21 is a display device that displays information to the user. As shown in FIG. 3(a), the display operating sheet 201 includes a paper icon 201a, an alert icon 201b, and a toner icon 201c as the display portion 21. The display operating sheet 201 functions as a first sheet on which patterns corresponding to information to be displayed are printed. The printed pattern is, hereinafter, referred to as an icon. The paper icon 201a indicates that there is no paper to inform the user that the sheet P stored in the feeding cassette has been consumed and run out (hereinafter referred to as "no paper"). The alert icon 201b indicates that a paper jam has occurred in the process of conveying the sheet P to inform the user of a paper jam, a conveyance delay and so forth (hereinafter referred to as "paper jam"). The toner icon 201c is an icon to inform the user that the process cartridge is not installed in the printer 100 (hereinafter referred to as "no process cartridge") or that the toner has been consumed and run out (hereinafter referred to as "no toner"). The toner icon 201c indicates that the printer 100 is in a state of no process cartridge or no toner.

The display operating sheet 201 includes a resume button icon 201d, a cancel button icon 201e, and a power button icon 201f as the operating portion 22. The display operating sheet 201 also functions as a second sheet on which patterns corresponding to operations by the user are printed, and in the embodiment 1, the first sheet and the second sheet are integrated. Incidentally, the display operating sheet 201 may be configured so as to separate the first sheet corresponding to the display portion 21 from the second sheet corresponding to the operating portion 22.

The resume button icon 201d is an icon used to resume the operation of the printer 100 which has been stopped, and the resumption of printing by the printer 100 is prompted by pressing the resume button icon 201d. The cancel button icon 201e is an icon used to cancel a job sent to the printer 100, and the job is canceled by pressing the cancel button icon 201e. The power button icon 201f is an icon used to turn the power of the printer 100 main unit on and off, and the power of the printer 100 is turned on and off by pressing the power button icon 201f.

The paper icon 201a, the alert icon 201b, the toner icon 201c, the resume button icon 201d, the cancel button icon 201e, and the power button icon 201f are printed on the display operating sheet 201. Incidentally, the configuration is not limited to a configuration in which icons are printed on the display operating sheet 201 but may include a configuration, for example, in which a sticker on which icons have been drawn is affixed to the display operating sheet 201. Hereinafter, the paper icon 201a, the alert icon 201b, the toner icon 201c, the resume button icon 201d, the cancel button icon 201e, and the power button icon 201f are also referred to as icon portions. Each icon portion is configured to allow light to pass through.

FIG. 3(b) is a figure illustrating a state in which the display operating sheet 201 is removed from the state in FIG. 3(a). Under the display operating sheet 201, there is a light guide 211, operating buttons 221, and an operating button cover 222. The operating button cover 222 covers an area around the operating buttons 221. The operating button 221d is pressed via the resume button icon 201d. The operating button 221e is pressed via the cancel button icon 201e. The operating button 221f is pressed via the power button icon 201f. The operating buttons 221d, 221e, and 221f are also referred to as button portions. A first outer circumferential surface 222a, a second outer circumferential surface 222b, an anti-collapse surface 222c, and a wall portion 222d will be described later.

Configuration to Reduce Unevenness of Light

Figure 4:
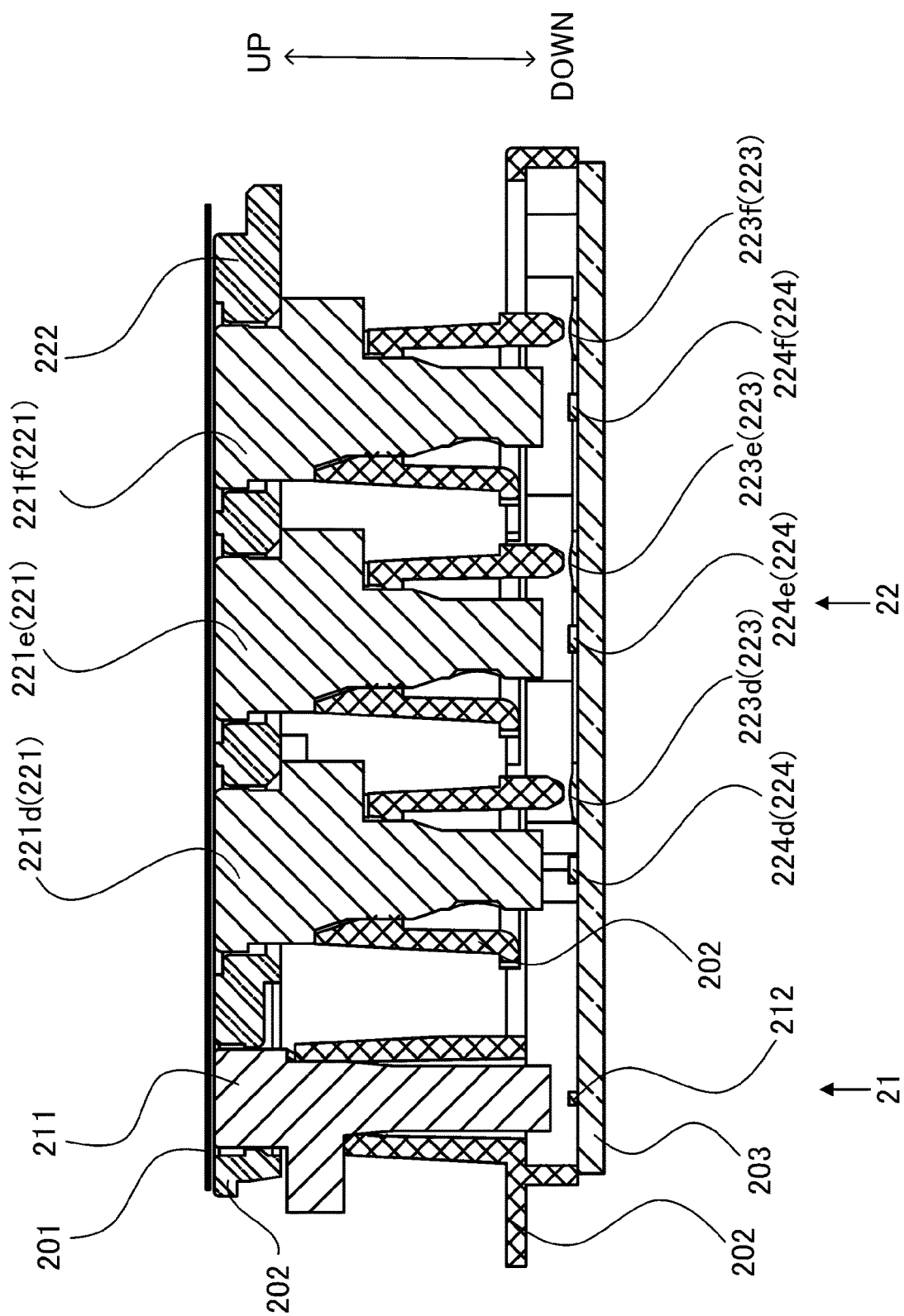
FIG. 4 is a cross-sectional view illustrating a configuration of an operating button according to the embodiment 1.

FIG. 4 is a figure illustrating a cross-sectional view of an arrow A-A in FIG. 3(a). The display portion 21 is comprised by, from top to bottom, the display operating sheet 201, the light guide 211, the button holder 202, and a display portion LED 212, as shown in FIG. 4. The display portion LED 212 is a light source that emits light to illuminate the icons and is mounted on the electric board 203 which is a first substrate.

Figure 5:
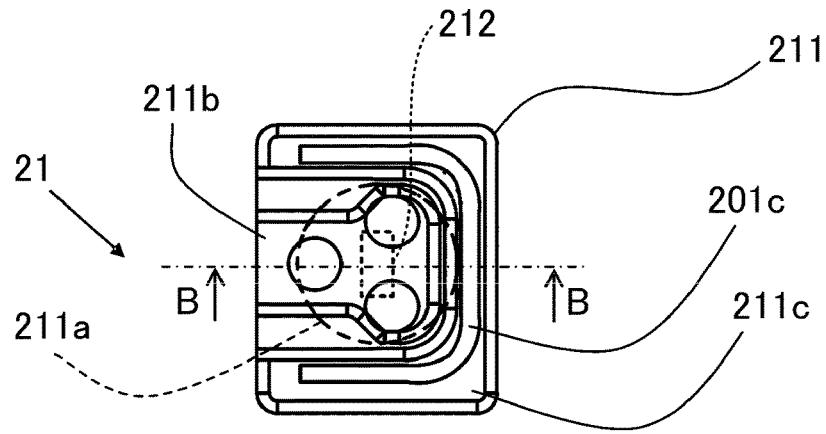
FIG. 5, part (a) and part (b), is a top view and a cross-sectional view illustrating a configuration of a display portion according to the embodiment 1.
Figure 5:
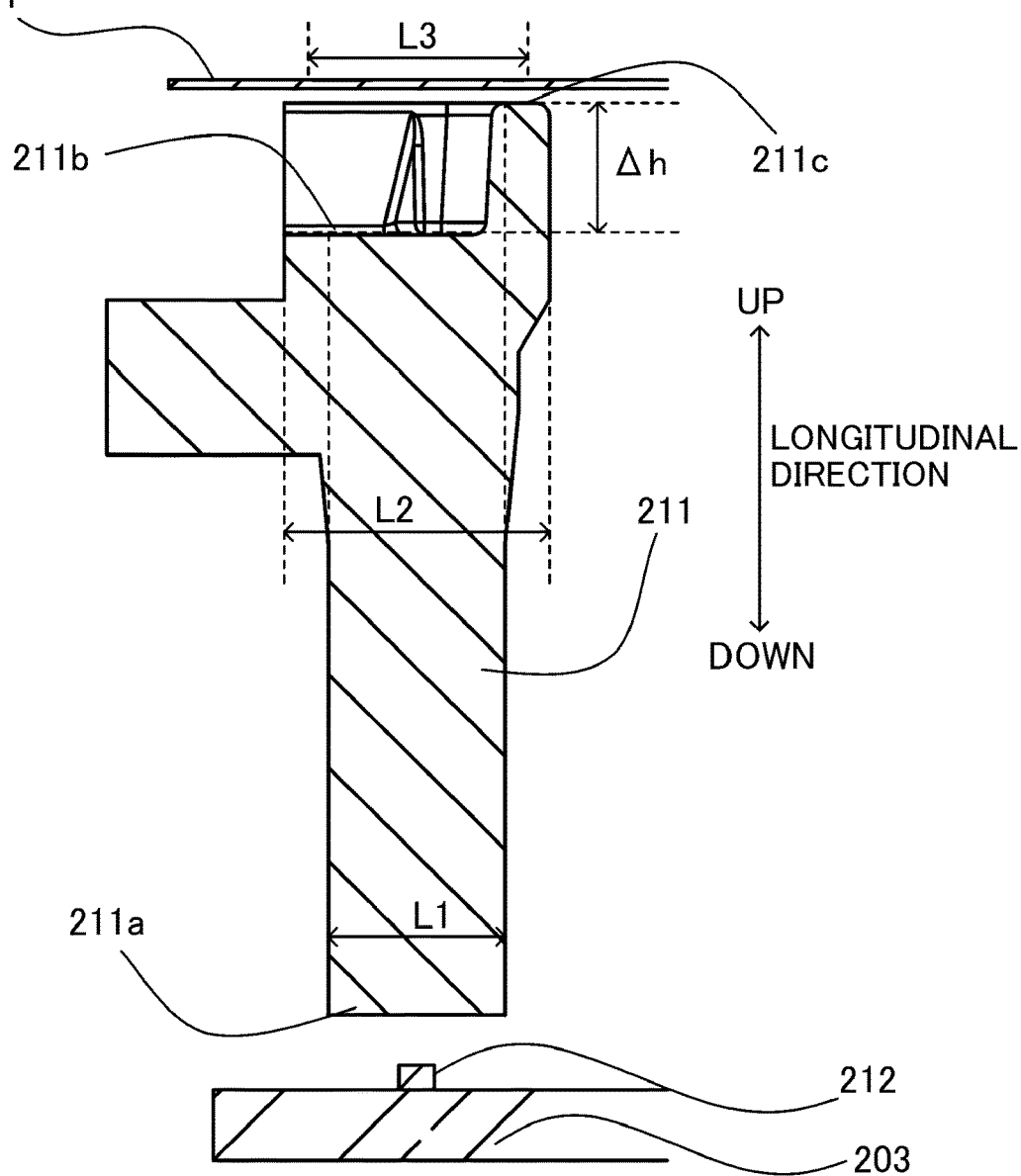

FIG. 5(a) is a top view illustrating a relationship between the toner icon 201c, the light guide 211, and the display portion LED 212, and part (b) is a cross-sectional view of an arrow B-B in part (a). The light guide 211, which is a guide member, passes through the display portion LED 212. The light guide 211 includes an incident surface 211a provided at one end portion in a first direction, which is perpendicular to the display operating sheet 201 (the first direction is the vertical direction in the embodiment 1 and is hereinafter referred to as a longitudinal direction), and into which light emitted from the display portion LED 212 enters. In addition, the light guide 211 includes an emission surface provided at the other end portion in the longitudinal direction, from which light incident from the incident surface 211a emits light. The light guide 211 guides light emitted from the display portion LED 212 to the display operating sheet 201.

Here, as shown in FIG. 5(a), the incident surface 211a (a dashed circle) of the light guide 211 is smaller than an area in which the icons are printed on the display operating sheet 201 when viewed from the longitudinal direction. Incidentally, the light guide 211 has a cylindrical shape at least on a side of the incident surface 211a, and its cross-section is circular as shown in FIG. 5(a). In addition, the emission surface of the light guide 211 includes two surfaces when viewed from the longitudinal direction: a directly above emission surface 211b, which is a first emission surface that includes a portion that overlaps at least a portion of the icon and that overlaps the display portion LED 212, and an outside directly above emission surface 211c, which is a second emission surface that includes a portion that overlaps at least a portion of the icon but that does not overlap the display portion LED 212. The outside directly above emission surface 211c is closer to the display operating sheet 201 than the directly above emission surface 211b.

The light guide 211 takes in the light emitted by the display portion LED 212 from the incident surface 211a and emits light from the directly above emission surface 211b, which is directly above the incident surface 211a, and the other (excluding the directly above emission surface 211b) outside directly above emission surface 211c. In more detail, the portion directly above the display portion LED 212 is designated as the directly above emission surface 211b, and the portion which is not directly above the display portion LED 212 is designated as outside directly above emission surface 211c. The directly above emission surface 211b is positioned closer to the incident surface 211a than the outside directly above emission surface 211c. This allows the outside directly above emission surface 211c to emit light at a position closer to the display operating sheet 201 than the directly above emission surface 211b. With respect to a light quantity emitted, the light quantity emitted from the directly above emission surface 211b is more (higher) than the light quantity emitted from the outside directly above emission surface 211c. Incidentally, how the directly above emission surface 211b and the outside directly above emission surface 211c are arranged in relation to one icon portion may be determined according to a design of the icon portion.

For example, the toner icon 201c shown in FIG. 5(a) includes a portion comprised of three circles and a U-shaped portion. In the embodiment 1, the toner icon 201c as a whole is uniformly illuminated by providing a directly above emission surface 211b below the portion comprised of three circles and the outside directly above emission surface 211c below the U-shaped portion. A difference in height between the directly above emission surface 211b and the outside directly above emission surface 211c, designated as Δh (see FIG. 5(b)), prevents unevenness of light on the toner icon 201c, making it easily visible. The height difference Δh may be adjusted according to the design of the icon portion.

In the cross-sectional view shown in FIG. 5(b), a length L1 of the incident surface 211a is shorter than a length L3 of the toner icon 201c. In addition, the length L1 of the incident surface 211a is shorter than a combined length L2 of the directly above emission surface 211b and the outside directly above emission surface 211c. Incidentally, the lengths L1, L2, and L3 are the lengths in the direction in which the operating buttons 221 are lined up (a front-back direction in FIG. 2). This relationship is the same for areas: an area of the incident surface 211a is smaller than a combined area of the directly above emission surface 211b and the outside directly above emission surface 211c. Incidentally, an area is an area of a plane orthogonal to the vertical direction (the longitudinal direction). Furthermore, the area of the incident surface 211a, shown in dashed lines in FIG. 5(a), is smaller than an area of the entire toner icon 201c of the display operating sheet 201, that is, an area to be illuminated (an emitting surface).

The reason that L1 is shorter than L2 and L3 is because of a lack of space due to the configuration. In addition, depending on a positional relationship and angle between the display portion LED 212 and the incident surface 211a, a difference in the light quantity to the toner icon 201c occurs even if a longer L1 is provided. Therefore, it is necessary to devise a way to uniformly illuminate the toner icon 201c.

The light quantity becomes lower on the display operating sheet 201 at a position corresponding to the directly above emission surface 211b by making the directly above emission surface 211b, which has a higher light quantity than the outside directly above emission surface 211c, emit light at a position farther away from the display operating sheet 201. This allows the light quantity from the directly above emission surface 211b to be the same as the light quantity from the outside directly above emission surface 211c at the position of the display operating sheet 201, thereby making it possible to reduce the unevenness of light on the display operating sheet 201.

Incidentally, the space between the directly above emission surface 211b and the display operating sheet 201 is an air layer, and the light emitted from the directly above emission surface 211b is diffused by the air layer.

Operating Portion

The operating portion 22 is an operating device that is operated by the user. In addition, as shown in FIG. 4, the operating portion 22 is comprised by, from top to bottom, the display operating sheet 201, the operating buttons 221, the operating button cover 222, the button holder 202, three tact switches 223, and three operating portion LEDs 224. The operating portion LEDs 224 are light sources that emit light to illuminate the icon. The operating portion LED 224 is mounted on the electric board 203 which is the second substrate. That is, in the embodiment 1, the first substrate on which the display portion LED 212 is mounted and the second substrate on which the operating portion LEDs 224 are mounted are integrated. Incidentally, the display portion LED 212 and the operating portion LEDs 224 may be mounted on separate substrates.

The operating buttons 221 (buttons) move in a movement direction (a vertical direction in the embodiment 1) when pressed via the display operating sheet 201. The operating button cover 222, which is a cover member, is provided closer to the operating buttons 221 side (button side) than the display operating sheet 201 and covers an area around the operating buttons 221.

The tact switch (a switch) 223 switches an electrical signal in interrelation with the pressing of the operating buttons 221. The electrical signal is transmitted to the control unit 120. Incidentally, the switch is not limited to a tact switch, but can be any switch that switches electrical signals when a force is exerted from the outside. Further, the switch is not limited to mechanical switches. The three tact switches 223 are: a tact switch 223d, which moves up and down in interrelation with the operating button 221d; a tact switch 223e, which moves up and down in interrelation with the operating button 221e; and a tact switch 223f, which moves up and down in interrelation with the operating button 221f. The three tact switches 223 are mounted on the electric board 203 which is the second substrate.

Figure 7:
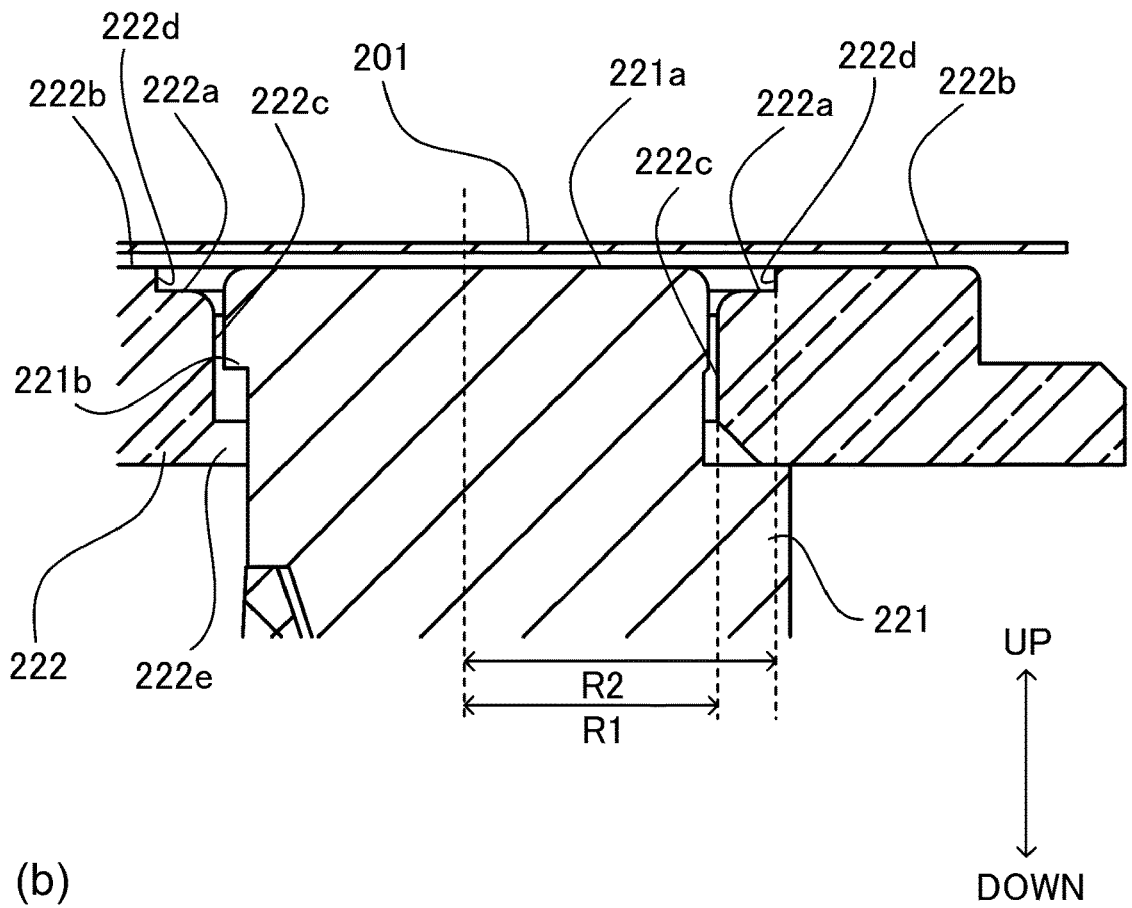
FIG. 7, part (a) and part (b), is a cross-sectional view illustrating a configuration of the operating button according to the embodiment 1.
Figure 7:
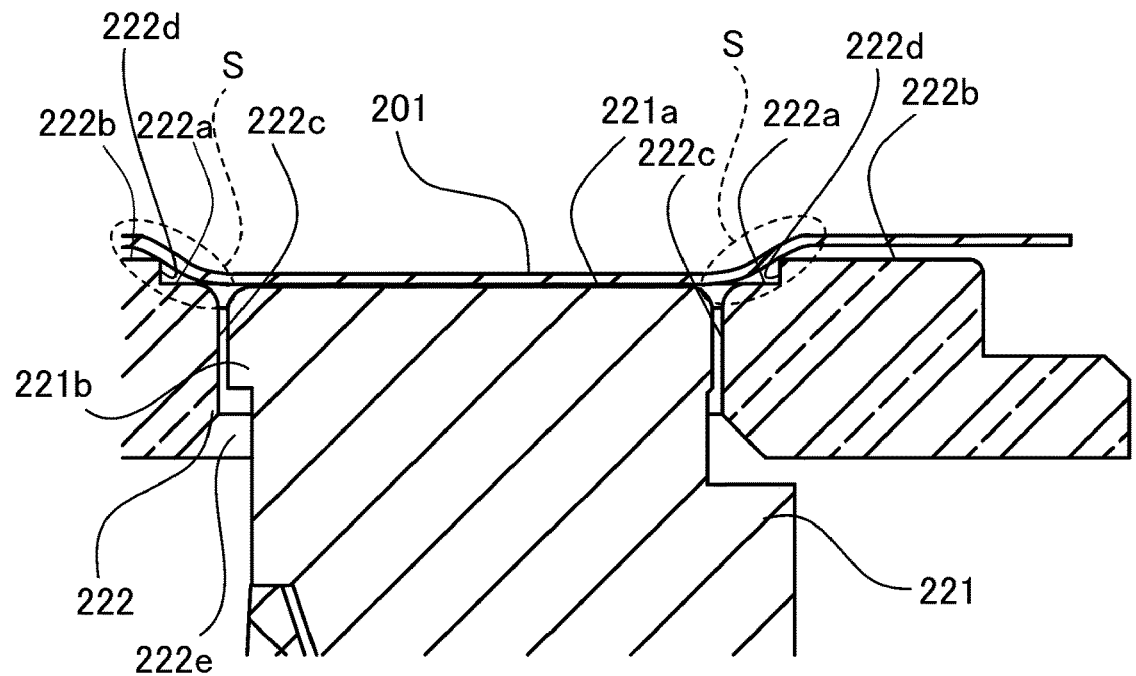

The operating buttons 221 include a sheet contact surface (a contact surface) 221a that contacts the display operating sheet 201 when pressed (see FIG. 7). In addition, the operating button cover 222 includes the second outer circumferential surface 222b, which is a first surface whose height in the movement direction is substantially the same as the sheet contact surface 221a when the operating buttons 221 are not pressed (see FIG. 7). Here, the term "substantially the same height" includes not only cases where the heights are strictly the same, but also cases where the heights can be regarded as being substantially the same.

Figure 6:
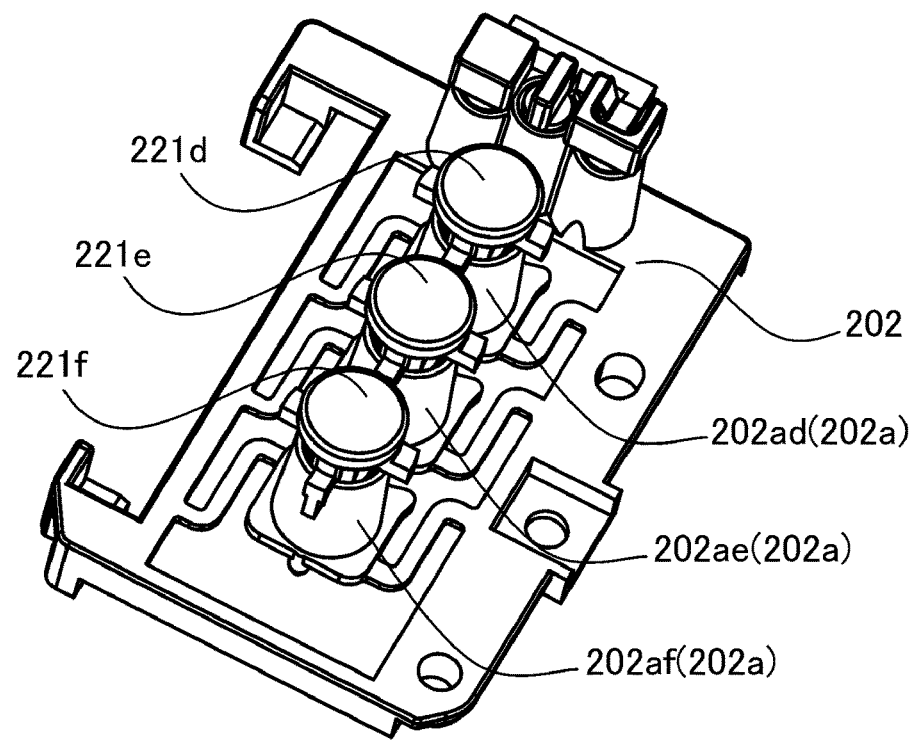
FIG. 6, part (a) and part (b), is a perspective view illustrating a configuration of the operating button according to the embodiment 1.
Figure 6:
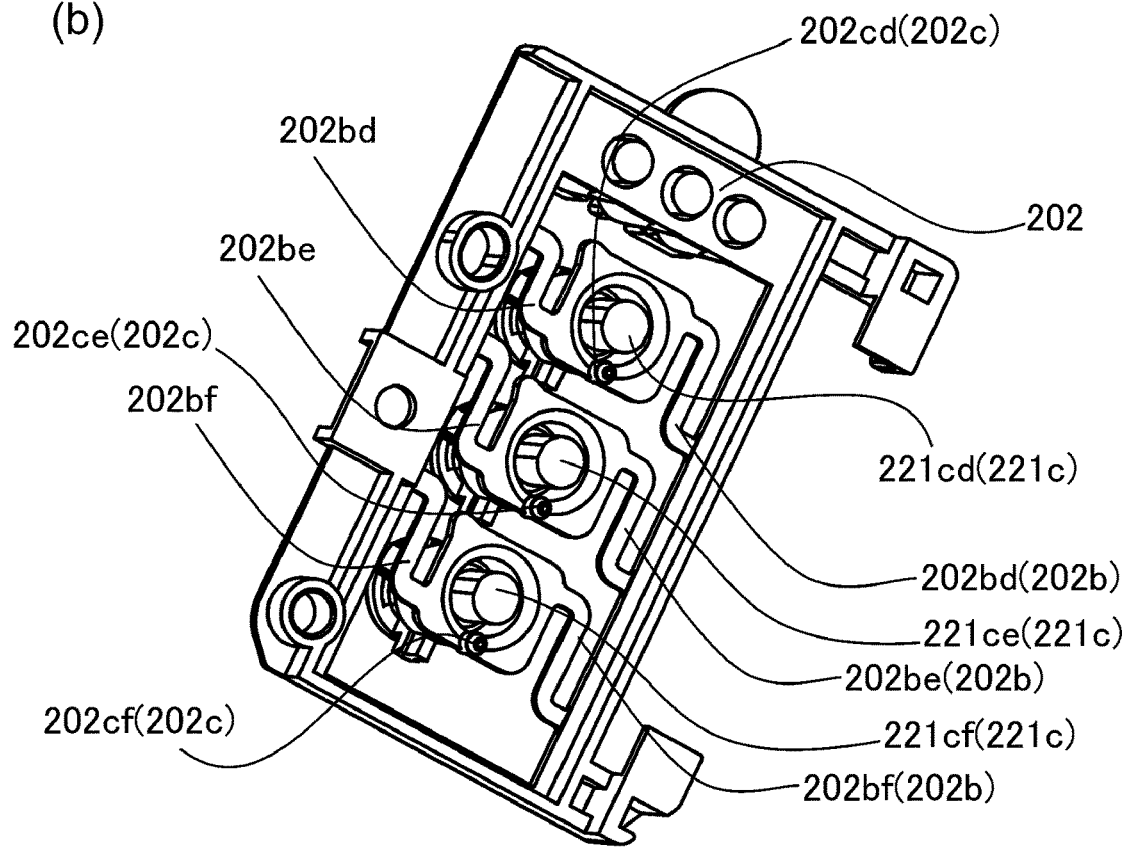

The operating buttons 221 include an incident surface 221c provided on an opposite end of the sheet contact surface 221a in the movement direction, to which light emitted from the operating portion LEDs 224 enters (see FIG. 6(b)). In detail, the operating button 221d includes an incident surface 221cd, the operating button 221e includes an incident surface 221ce, and the operating button 221f includes an incident surface 221cf. Incidentally, the operating buttons 221 have a cylindrical shape. The sheet contact surface 221a of the operating buttons 221 functions as an emitting surface that emits light entering from the incident surface 221c. That is, the operating buttons 221 function as a guide member that guides the light emitted from the operating portion LEDs 224 to the display operating sheet 201.

The operating button cover 222 includes a first outer circumferential surface 222a, which is a second surface whose height in the movement direction is substantially the same as the sheet contact surface 221a when the operating buttons 221 are pressed (see FIG. 7). The first outer circumferential surface 222a is provided closer to the operating buttons 221 than the second outer circumferential surface 222b in a direction substantially orthogonal to the movement direction (see FIG. 7). The first outer circumferential surface 222a and the second outer circumferential surface 222b are connected stepwise (see FIG. 7). The operating button cover 222 is provided substantially parallel to the movement direction and includes the anti-collapse surface 222c, which is a regulating surface that does not contact the operating buttons 221 when the operating buttons 221 are not pressed (see FIG. 7). Here, the term "substantially parallel" includes not only cases where items are strictly parallel but also cases where items can be regarded as being substantially parallel. Details will be described below using figures.

FIG. 6(a) is a top perspective view of the button portion of the operating portion 22, and FIG. 6(b) is a bottom perspective view of the button portion of the operating portion 22. The button holder 202 includes a button holding portion 202a, a button flexible pair 202b, and a button pressing portion 202c, each of which are provided with three locations. The button holding section 202a holds the operating buttons 221. The button flexible pair 202b is flexed when the operating buttons 221 are pressed by the user. The button pressing portion 202c presses the tact switch 223 when the operating button 221 are pressed.

The three button holding portions 202a are, specifically: a button holding portion 202ad, which holds the operating button 221d; a button holding portion 202ae, which holds the operating button 221e; and a button holding portion 202af, which holds the operating button 221f. The three button flexible pairs 202b are, specifically: a button flexible pair 202bd, which is flexed when the operating button 221d is pressed; a button flexible pair 202be, which is flexed when the operating button 221e is pressed; and a button flexible pair 202bf, which is flexed when the operating button 221f is pressed. The three button pressure sections 202c are, specifically: a button pressure section 202cd, which is interrelated to the pressing of operating button 221d; a button pressure section 202ce, which is interrelated to the pressing of operating button 221e; and a button pressure section 202cf, which is interrelated to the pressing of operating button 221f.

The three operating portion LEDs 224 (see FIG. 4) on the electric board 203 are each located in the center of the operating buttons 221 when viewed from the top. The operating portion LEDs 224 are, respectively, when viewed from the top: an operating portion LED 224d located in the center of the operating button 221d; an operating portion LED 224e located in the center of the operating button 221e; and an operating portion LED 224f located in the center of the operating button 221f. In addition, the operating buttons 221 also function as light guides so that light can pass through it. In other words, the light guides also serve as the operating buttons 221. The operating buttons 221, which also serve as the light guides, include the incident surface 221c (see FIG. 6(b)) and the emission surface (the sheet contact surface 221a) as the light guide 211 described above. In addition, an area of the incident surface is smaller than that of the emission surface.

Operating Button Cover

There is a need for operating portions with good operability and visibility. A method for providing an operating portion with good operability and visibility is described.

FIG. 7 illustrates a detailed view of an area close to the display operating sheet 201, the operating buttons 221, and the operating button cover 222 in a cross-sectional view of the arrow A-A in FIG. 3(a). FIG. 7(a) illustrates a state before the operating buttons 221 are pressed, and FIG. 7(b) illustrates a state when the operating buttons 221 are being pressed. The operating buttons 221 are located directly below the resume button icon 201d, the cancel button icon 201e, and the power button icon 201f on the display operating sheet 201, respectively.

The operating buttons 221 include the sheet contact surface 221a that contacts the display operating sheet 201 when the user presses the operating buttons 221 via the icon portion. The sheet contact surface 221a is also the emission surface from which light emitted from the operating portion LEDs 224 that comes through the operating buttons 221 as light guides. The operating button cover 222 includes the first outer circumferential surface 222a, the second outer circumferential surface 222b, the anti-collapse surface 222c, and the wall portion 222d. The first outer circumferential surface 222a covers the periphery of the operating buttons 221. The second outer circumferential surface 222b is one round outside the first outer circumferential surface 222a, is one step higher than the first outer circumferential surface 222a and is the surface in contact with the display operating sheet 201. The anti-collapse surface 222c prevents the operating buttons 221 from collapsing. The wall portion 222d goes upward from the first outer circumferential surface 222a and connects the first outer circumferential surface 222a to the second outer circumferential surface 222b. That is, if a distance from the center of the operating buttons 221 to the anti-collapse surface 222c is defined as R1, and a distance from the center of the operating buttons 221 to the wall portion 222d is defined as R2, then the distance R2 is greater than the distance R1 (R2>R1). The anti-collapse surface 222c is a side surface of the first outer circumferential surface 222a and contacts the operating buttons 221 when operated by the user. The second outer circumferential surface 222b may be in contact with the display operating sheet 201 at all times, or only when the user operates the operating buttons 221.

The height of the second outer circumferential surface 222b is approximately the same height as a height of the sheet contact surface 221a which contacts the display operating sheet 201 of the operating buttons 221 in a normal state (a state in which the operating buttons 221 are not pressed) shown in FIG. 7(a). The height of the first outer circumferential surface 222a is approximately the same height as the height of the sheet contact surface 221a of the operating buttons 221 when the button pressure portion 202c of the button holder 202 and the tact switch 223 contact and butt against each other in a state in which the operating buttons 221 are pressed by the user as shown in FIG. 7(b). That is, a distance traveled by the operating buttons 221 from the state in which the operating buttons 221 are not pressed to the state in which the operating buttons 221 are pressed and the button pressure portion 202c contacts the tact switch 223 is substantially equal to the height of the wall portion 222d. In other words, in the normal state, the distance between the sheet contact surface 221a and the second outer circumferential surface 222b is shorter than the distance between the sheet contact surface 221a and the first outer circumferential surface 222a with respect to the moving direction. And, in the state in which the operating buttons 221 are pressed, the distance between the sheet contact surface 221a and the first outer circumferential surface 222a is shorter than the distance between the sheet contact surface 221a and the second outer circumferential surface 222b with respect to the moving direction. Incidentally, the term "substantially equal" includes not only cases where the heights are strictly equal, but also cases where the heights can be regarded as being substantially equal.

In addition, as shown in FIG. 3(b), a plurality of operating buttons 221 includes the first outer circumferential surface 222a and the second outer circumferential surface 222b, respectively. The second outer circumferential surface 222b is a portion provided between each operating button 221 and is continuous. When each operating button 221 is pressed via the display operating sheet 201, the display operating sheet 201 is flexed. However, as shown in FIG. 7(b), an area flexed by the display operating sheet 201 is limited to an area S, indicated by the dashed line.

The operating buttons 221 include a flange portion 221b. The flange portion 221b protrudes toward the operating button cover 222. The operating button cover 222 includes a protruding portion 222e. The protruding portion 222e is provided in a lower position than the flange portion 221b of the operating buttons 221. The configuration is such that, when the operating buttons 221 are pressed, the flange portion 221b contacts the protruding portion 222e, the operating buttons 221 are not pushed any further downward. When the operating buttons 221 are not pressed, the flange portion 221b and the anti-collapse surface 222c do not contact, and a gap (a space or a clearance) of a predetermined distance is provided.

Thus, by providing a space between the display operating sheet 201 and the first outer circumferential surface 222a, the operability of the operating portion 22 can be maintained. In addition, providing the second outer circumferential surface 222b makes it is possible to limit the area S, which the display operating sheet 201 is flexed, to an area substantially straight above the first outer circumferential surface 222a. As a result, the flexible of the display operating sheet 201 can be reduced. With such a configuration, it is possible to provide the operating portion 22 which maintains operability and has good visibility.

According to the embodiment 1 described above, it is possible to provide a display portion with good visibility in a display portion or in an operating portion using a light source.

Embodiment 2

In an embodiment 2, a difference from the embodiment 1 is that the directly above emission surface 211b of the light guide 211 is roughened. In the embodiment 2, a roughening process (graining), for example, with a grain or the like is applied to the directly above emission surface 211b shown in FIG. 5. This roughening process allows the light to be further diffused on the directly above emission surface 211b. Such processing on the directly above emission surface 211b becomes effective in cases, for example, where it is difficult to adjust light quantity because a step (difference in height, Δh) with the outside directly above emission surface 211c cannot be widened, or in cases where it is desirable to reduce unevenness of light further. Incidentally, processes are not limited to graining, but may include, for example, dimpling, embossing, or any other process that roughens the surface of the directly above emission surface 211b. In addition, the configuration is not limited to a configuration in which the directly above emission surface 211b is processed to diffuse light, but a material with light diffusing properties may be provided on the directly above emission surface 211b.

According to the embodiment 2 described above, it is possible to provide a display portion with good visibility in a display portion or in an operating portion using a light source.

Embodiment 3

Figure 8:
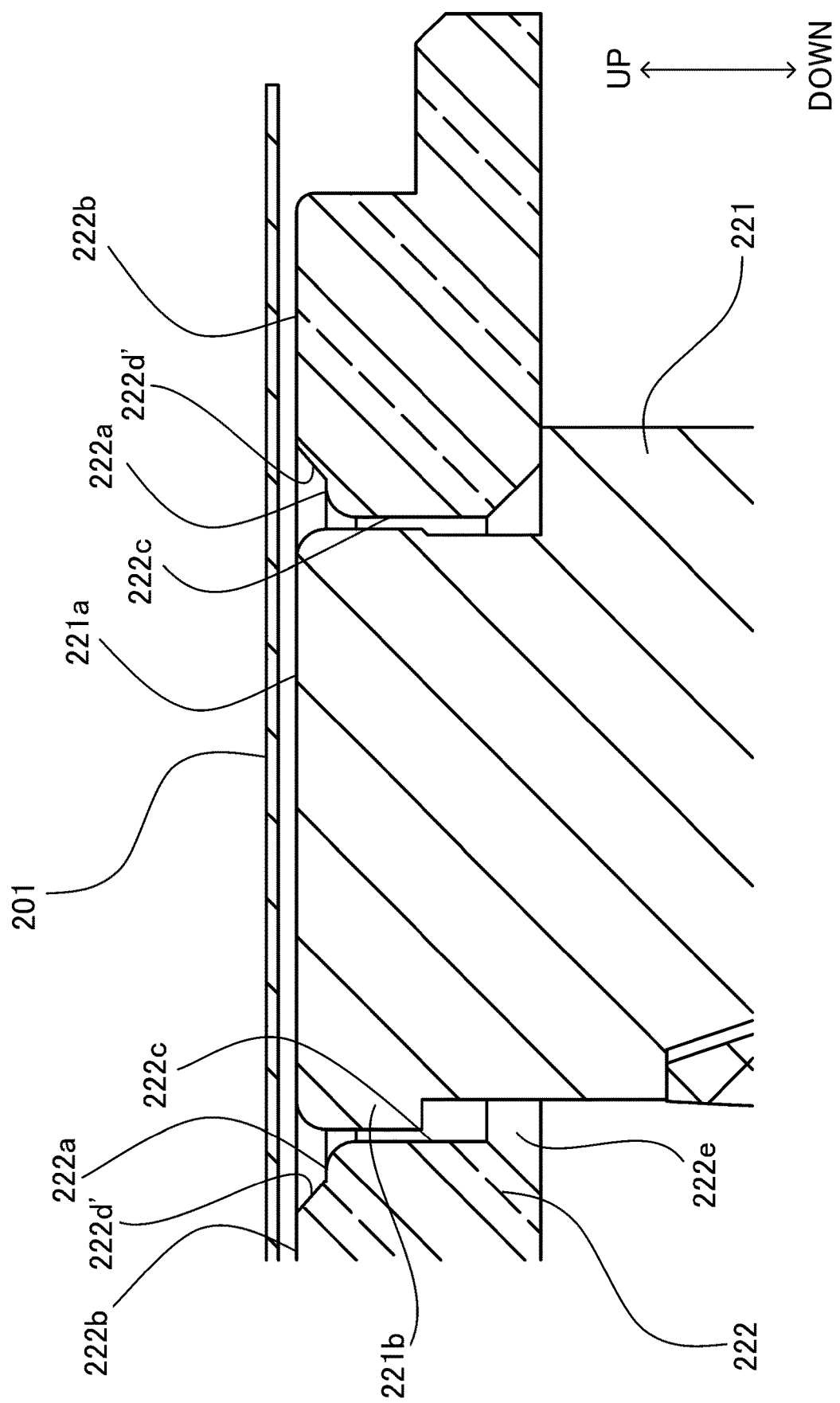
FIG. 8 is a cross-sectional view illustrating a configuration of the operating button according to the embodiment 2.

In an embodiment 3, the difference from the embodiment 1 is that the first outer circumferential surface 222a and the second outer circumferential surface 222b are connected by a slope. FIG. 8 is a cross-sectional view of the operating button cover 222 of the embodiment 3, illustrating the state in which the operating buttons 221 are not pressed. The first outer circumferential surface 222a and the second outer circumferential surface 222b of the operating button cover 222 are connected by a slope 222d'. This differs from the embodiment 1, in which the first outer circumferential surface 222a and the second outer circumferential surface 222b were connected stepwise via the wall 222d. When the display operating sheet 201 is pressed by the user, the display operating sheet 201 sinks smoothly along the slope 222d', thereby reducing scratches and marks on the display operating sheet 201 that may be caused by bumps.

According to the embodiment 3 described above, it is possible to provide a display portion with good visibility in a display portion or in an operating portion using a light source.

According to the present invention, it is possible to provide a display with good visibility in a display or in an operating portion using a light source.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-027106 filed on Feb. 24, 2022, which is hereby incorporated by reference herein in its entirety.

What is claimed is:

1. A display device displaying information to a user, the display device comprising:
a first sheet on which a pattern corresponding to the information is provided;
a light source configured to emit light to brighten the pattern; and
a light guide including (1) an incident surface provided at one end portion thereof with respect to a first direction perpendicular to the first sheet and permitting incidence of the light emitted from the light source and (2) an emission surface provided at the other end portion thereof with respect to the first direction and permitting emission of the light incident from the incident surface, wherein the light guide is configured to guide the light emitted from the light source to the first sheet so that the pattern is illuminated,
wherein, as viewed in the first direction, the incident surface is smaller than an area where the pattern is provided on the first sheet,
wherein, as viewed in the first direction, the emission surface includes (1) a first emission surface which overlaps at least a part of the pattern and has a portion overlapping the light source, and (2) a second emission surface which overlaps at least a part of the pattern and does not overlap the light source,
wherein the area where the pattern is provided is smaller than a combined area of the first emission surface and the second emission surface with respect to a plane orthogonal to the first direction, and
wherein the second emission surface is closer to the first sheet than the first emission surface.

2. A display device according to claim 1, wherein the first emission surface is roughened.

3. A display device according to claim 1, further comprising a first substrate on which the light source is mounted.

4. An image forming apparatus comprising:
a display device according to claim 1; and
an image forming portion configured to form an image on a recording material.

5. An image forming apparatus comprising:
a display device according to claim 1;
an operating device in which an operation is performed by a user, the operating device comprising: (a) a second sheet on which a pattern corresponding to the operation is provided; (b) a button moving in a moving direction by being pressed via the second sheet; (c) a cover member covering a periphery of the button; and (d) a switch switching an electric signal in interrelation with pressing the button, wherein the button includes a contacting surface contacting the second sheet when the second sheet is pressed so that the button is pressed via the second sheet, wherein the cover member includes a first surface which is configured to contact the second sheet, and a second surface; and wherein the first surface is higher than the second surface, and the second surface is provided at a position closer to the button with respect to a direction perpendicular to the moving direction than the first surface; and an image forming portion configured to form an image on a recording material.

6. An image forming apparatus comprising:

a display device, including a first sheet, according to claim 1;

an operating device in which an operation is performed by a user, the operating device comprising: (a) a second sheet on which a pattern corresponding to the operation is provided; (b) a button moving in a moving direction by being pressed via the second sheet; (c) a cover member covering a periphery of the button; and (d) a switch switching an electric signal in interrelation with pressing the button, wherein the button includes a contacting surface contacting the second sheet when the second sheet is pressed so that the button is pressed via the second sheet, wherein the cover member includes a first surface which is configured to contact the second sheet, and a second surface; and wherein the first surface is higher than the second surface, and the second surface is provided at a position closer to the button with respect to a direction perpendicular to the moving direction than the first surface; and an image forming portion configured to form an image on a recording material, wherein the first sheet and the second sheet are integrated.

7. An image forming apparatus comprising:

a display device, including a first substrate, according to claim 1;

an operating device in which an operation is performed by a user, the operating device comprising: (a) a second sheet on which a pattern corresponding to the operation is provided; (b) a button moving in a moving direction by being pressed via the second sheet; (c) a cover member covering a periphery of the button; and (d) a switch switching an electric signal in interrelation with pressing the button, wherein the button includes a contacting surface contacting the second sheet when the second sheet is pressed so that the button is pressed via the second sheet, wherein the cover member includes a first surface which is configured to contact the second sheet, and a second surface; and wherein the first surface is higher than the second surface, and the second surface is provided at a position closer to the button with respect to a direction perpendicular to the moving direction than the first surface, the operating device further including a second substrate; and an image forming portion configured to form an image on a recording material, wherein the first substrate and the second substrate are integrated.

8. The display device according to claim 1, wherein the pattern is an icon portion including a first portion and a second portion separated from the first portion, and wherein, as viewed in the first direction, the first emission surface overlaps the first portion and the second emission surface overlaps the second portion.

9. The display device according to claim 1, wherein the pattern includes a first portion and a second portion separated from the first portion, and wherein, as viewed in the first direction, the first emission surface overlaps the first portion and the second emission surface overlaps the second portion.

10. The display device according to claim 1, wherein the incident surface is provided at one end of the light guide and the emission surface is provided at the other end of the light guide with respect to a longitudinal direction of the light guide.

11. The display device according to claim 9, wherein the pattern is an icon portion, and wherein the second portion is a U-shaped portion.

12. The display device according to claim 10, wherein the longitudinal direction of the light guide is along the first direction.

13. An operating device in which an operation is performed by a user, the operating device comprising:

a sheet on which a pattern corresponding to the operation is provided;

a button moving in a moving direction by being pressed via the sheet;

a cover member covering a periphery of the button; and a switch switching an electric signal in interrelation with pressing the button, wherein the button includes a contacting surface contacting the sheet when the sheet is pressed so that the button is pressed via the sheet, wherein the cover member includes (1) a first surface extending in a direction crossing with respect to the moving direction, the first surface being configured to contact the sheet, and (2) a second surface extending in a direction crossing with respect to the moving direction, wherein the first surface is higher than the second surface with respect to the moving direction, wherein the second surface is provided at a position closer to the button with respect to a direction perpendicular to the moving direction than the first surface, wherein the button is movable to a position in which the contacting surface is lower than the first surface with respect to the moving direction, and wherein the button is movable to a position at which a position of the contacting surface is equal to a position of the second surface with respect to the moving direction.

14. An operating device according to claim 13, wherein the first surface and the second surface are connected stepwise.

15. An operating device according to claim 13, wherein the first surface and the second surface are connected by an inclined surface.

16. An operating device according to claim 13, wherein the cover member includes a restricting surface extending along the moving direction, and wherein the restricting surface is configured to prevent the button from collapsing.

17. A display device according to claim 13, further comprising a substrate on which the switch is mounted.

18. An image forming apparatus comprising:
an operating device according to claim 13; and
an image forming portion configured to form an image on a recording material.

19. The display device according to claim 13, wherein the contact surface is away from the sheet in a state before the sheet and the button are pressed.

20. A display device according to claim 17, further comprising a light source configured to emit light to brighten the pattern,
- wherein the button includes an incident surface provided at an end portion of a side opposite to the contacting surface with respect to the moving direction and permitting incidence of the light emitted from the light source,
- wherein the contacting surface thereof functions as an emission surface permitting emission of the light incident from the incident surface, and
- wherein the button functions as a light guide to guide the light emitted from the light source to the sheet.

21. An operating device according to claim 20, wherein the light source is mounted on the substrate.

\* \* \* \* \*